(12) United States Patent
Uszkoreit et al.

(10) Patent No.: US 9,292,500 B2
(45) Date of Patent: *Mar. 22, 2016

(54) VIRTUAL PARTICIPANT-BASED REAL-TIME TRANSLATION AND TRANSCRIPTION SYSTEM FOR AUDIO AND VIDEO TELECONFERENCES

(71) Applicant: Google Inc., Mountain View, CA (US)

(72) Inventors: Jakob David Uszkoreit, San Francisco, CA (US); Ashish Venugopal, Emeryville, CA (US); Johan Schalkwyk, Scarsdale, NY (US); Joshua James Estelle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/486,312

(22) Filed: Sep. 15, 2014

(65) Prior Publication Data
US 2015/0006144 A1   Jan. 1, 2015

Related U.S. Application Data

(63) Continuation of application No. 13/459,293, filed on Apr. 30, 2012, now Pat. No. 8,838,459.

(60) Provisional application No. 61/604,773, filed on Feb. 29, 2012.

(51) Int. Cl.
*G10L 21/00* (2013.01)
*G10L 25/00* (2013.01)
*G06F 17/28* (2006.01)
(Continued)

(52) U.S. Cl.
CPC ............ *G06F 17/289* (2013.01); *G10L 15/005* (2013.01); *H04M 3/568* (2013.01)

(58) Field of Classification Search
CPC ..................................................... G06F 17/289
USPC ...................... 704/2–8, 270, 277; 379/202.01
See application file for complete search history.

(56) References Cited

U.S. PATENT DOCUMENTS

| | | |
|---|---|---|
| 6,292,769 B1 | 9/2001 | Flanagan et al. |
| 6,693,663 B1 | 2/2004 | Harris |
| 6,816,468 B1 | 11/2004 | Cruickshank |

(Continued)

FOREIGN PATENT DOCUMENTS

WO   2005048509 A2   5/2005

*Primary Examiner* — Shaun Roberts
(74) *Attorney, Agent, or Firm* — Remarck Law Group PLC

(57) ABSTRACT

The present disclosure describes a teleconferencing system that may use a virtual participant processor to translate language content of the teleconference into each participant's spoken language without additional user inputs. The virtual participant processor may connect to the teleconference as do the other participants. The virtual participant processor may intercept all text or audio data that was previously exchanged between the participants may now be intercepted by the virtual participant processor. Upon obtaining a partial or complete language recognition result or making a language preference determination, the virtual participant processor may call a translation engine appropriate for each of the participants. The virtual participant processor may send the resulting translation to a teleconference management processor. The teleconference management processor may deliver the respective translated text or audio data to the appropriate participant.

18 Claims, 3 Drawing Sheets

(51) Int. Cl.
  *G10L 15/00* (2013.01)
  *H04M 3/56* (2006.01)

(56) References Cited

U.S. PATENT DOCUMENTS

| | | |
|---|---|---|
| 6,999,932 B1 | 2/2006 | Zhou |
| 8,012,023 B2 | 9/2011 | Gates et al. |
| 8,041,018 B2 | 10/2011 | Wald et al. |
| 8,140,980 B2 | 3/2012 | Gunasekar et al. |
| 8,175,244 B1 | 5/2012 | Frankel |
| 8,279,861 B2 | 10/2012 | Chao-Suren et al. |
| 8,379,072 B2 | 2/2013 | Hybschmann et al. |
| 2004/0122677 A1 | 6/2004 | Lee et al. |
| 2008/0300852 A1 | 12/2008 | Johnson et al. |
| 2009/0125295 A1 | 5/2009 | Drewes |
| 2009/0187400 A1 | 7/2009 | Liu et al. |
| 2010/0283829 A1 | 11/2010 | Beer et al. |
| 2010/0293230 A1 | 11/2010 | Lai et al. |
| 2011/0283203 A1 | 11/2011 | Periyannan et al. |

VIRTUAL PARTICIPANT-BASED REAL-TIME TRANSLATION AND TRANSCRIPTION SYSTEM FOR AUDIO AND VIDEO TELECONFERENCES

CROSS REFERENCE TO RELATED APPLICATIONS

This application is a continuation of U.S. patent application Ser. No. 13/459,293, filed Apr. 30, 2012, which claims the benefit of U.S. Provisional Application No. 61/604,773, filed Feb. 29, 2012. The disclosures of each of the above applications are incorporated herein by reference in their entirety.

BACKGROUND

Some teleconference systems may utilize dedicated translation software executed by a centralized conferencing system to provide translation services to a teleconference. These systems may have a limited number of languages available in the translation software. As a result, all users may not be able to fully participate in the teleconference. In addition, the incorporation of the translation functionality into the conferencing system adds a further level of complexity and expense to the conferencing system. Some systems also may incorporate some form of translation functionality in the end user device. However, this adds yet further complexity and expense to the end user devices, but also adds complexity to the centralized conferencing system.

BRIEF SUMMARY

According to an embodiment of the disclosed subject matter, the implementation may provide a teleconferencing system including a teleconference management processor and a virtual participant processor. The teleconferencing systems includes inputs for receiving audio data and control signals from end user devices that are connected in a teleconference session, and outputs for delivering audio data to the end user devices. The teleconferencing system may include a teleconference management processor and a virtual participant processor. The teleconference management processor may manage a teleconference between a plurality of end user devices. The teleconference management processor may be configured to receive a request from one of the participants in the teleconference for the addition of a virtual participant processor to the teleconference. In responsive to the request, a virtual participant processor may be connected to the teleconference session. The delivered translated data may be received from the virtual participant processor to the respective teleconference end user devices. The virtual participant processor may provide translation services to the teleconference management processor. The virtual participant processor may be configured to intercept speech data from each of the teleconference participants. Each of the teleconference participants' languages may be recognized from the intercepted speech. The intercepted speech data may be translated from the recognized language of each of the teleconference participants into the recognized speech language of the requesting participant. The translated speech data may be provided to the teleconference management processor.

The teleconference management may determine the language preferences of each of the teleconference end user devices. The teleconference management processor may respond to an end user request for a virtual participant processor by sending a request to the virtual participant processor to join the established teleconference. The teleconference management processor may provide the language preferences setting of each of the teleconference participants to the virtual participant.

The teleconference management processor may respond to an end user request for a virtual participant processor by sending a request to the virtual participant processor to join the established teleconference. The virtual participant processor may respond to the request from the conference management processor to join the established teleconference by connecting to the teleconference session. The virtual participant processor may translate speech or text data of other end user devices participating in the teleconference into the language indicated by the language preferences of the requesting end user device, wherein the translation functions are performed only for the requesting end user device. The teleconferencing system may include a translation server that may respond to control signals and data received from the virtual participant processor. The translation server may translate the data received from the virtual participant processor into a language different than the language of the data received by the virtual processor. The data received from the virtual participant may include language preferences settings of end user devices connected in the teleconference, and audio data received from each of the respective end user devices.

According to an embodiment of the disclosed subject matter, the implementation may include a method for providing translation services during a teleconference. A request may be received from a first teleconference participant of a plurality of teleconference participants for translation services. In response to the request, a virtual participant processor may be connected to the teleconference session in the same manner that each of the teleconference participants connects to the teleconference session. The virtual participant processor may provide language translation services for the teleconference participants. The virtual participant may intercept data from each of the teleconference participants. The intercepted data may be translated into an identified language of each of the plurality of teleconference participants. The translated data may be received for delivery to each respective participant. The translated data may be output.

A language of each of the plurality of teleconference participants may be identified by recognizing a speech language of the data intercepted from each teleconference participant. Or, the language of each of the plurality of teleconference participants may be identified by determining a language preference setting of each of the plurality of teleconference participants after each teleconference participant connects to the teleconference session. The virtual participant may call a translation server that is configured to translate the intercepted data based on the determined language preferences of the teleconference participants.

A benefit of the presently disclosed subject matter is that the translation functions are provided outside of the teleconferencing management system, which reduces the computational burden on the teleconferencing management system. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
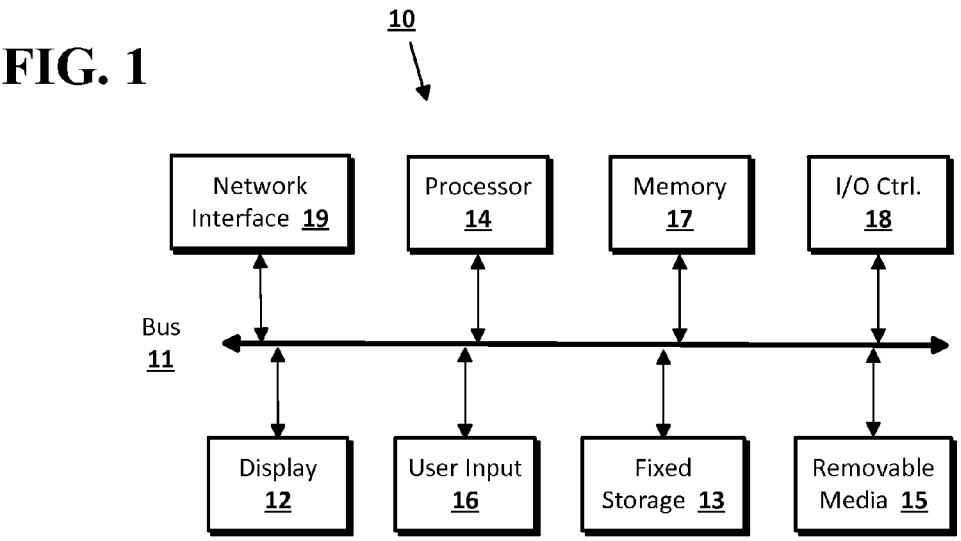
FIG. 1 shows a computer according to an embodiment of the disclosed subject matter.

Embodiments of the presently disclosed subject matter may be implemented in and used with a variety of component and network architectures. FIG. 1 is an example computer 10 suitable for implementing embodiments of the presently disclosed subject matter. The conferencing services server and translation services server may be incorporated into computer 10 or may be multiple computers similar to computer 10. The computer 10 includes a bus 11 which interconnects major components of the computer 10, such as a central processor 14, a memory 17 (typically RAM, but which may also include ROM, flash RAM, or the like), an input/output controller 18, a user display 12, such as a display screen via a display adapter, a user input interface 16, which may include one or more controllers and associated user input devices such as a keyboard, mouse, and the like, and may be closely coupled to the I/O controller 18, fixed storage 13, such as a hard drive, flash storage, Fibre Channel network, SAN device, SCSI device, and the like, and a removable media component 15 operative to control and receive an optical disk, flash drive, and the like.

The bus 11 allows data communication between the central processor 14 and the memory 17, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 10 are generally stored on and accessed via a computer readable medium, such as a hard disk drive (e.g., fixed storage 330), an optical drive, floppy disk, or other removable storage medium 15.

The fixed storage 13 may be integral with the computer 10 or may be separate and accessed through other interfaces. A network interface 390 may provide a direct connection to a remote server via a telephone link, to the Internet via an internet service provider (ISP), or a direct connection to a remote server via a direct network link to the Internet via a POP (point of presence) or other technique. The network interface 19 may provide such connection using wireless techniques, including digital cellular telephone connection, Cellular Digital Packet Data (CDPD) connection, digital satellite data connection or the like. For example, the network interface 19 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Computer code to implement the present disclosure can be stored in computer-readable storage media such as one or more of the memory 17, fixed storage 13, removable media 15, or on a remote storage location.

Figure 2:
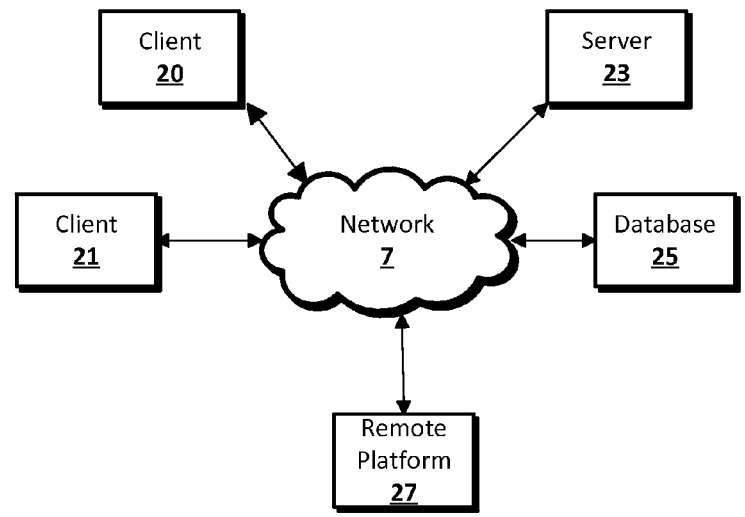
FIG. 2 shows a network configuration according to an embodiment of the disclosed subject matter.

FIG. 2 shows an example network arrangement according to an embodiment of the disclosed subject matter. One or more clients 20, 21, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 23 and/or databases 25. The devices may be directly accessible by the clients 20, 21, or one or more other devices may provide intermediary access such as where a server 23 provides access to resources stored in a database 25. The clients 20, 21 also may access remote platforms 27 or services provided by remote platforms 27 such as cloud computing arrangements and services. The remote platform 27 may include one or more servers 23 and/or databases 25.

Figure 3:
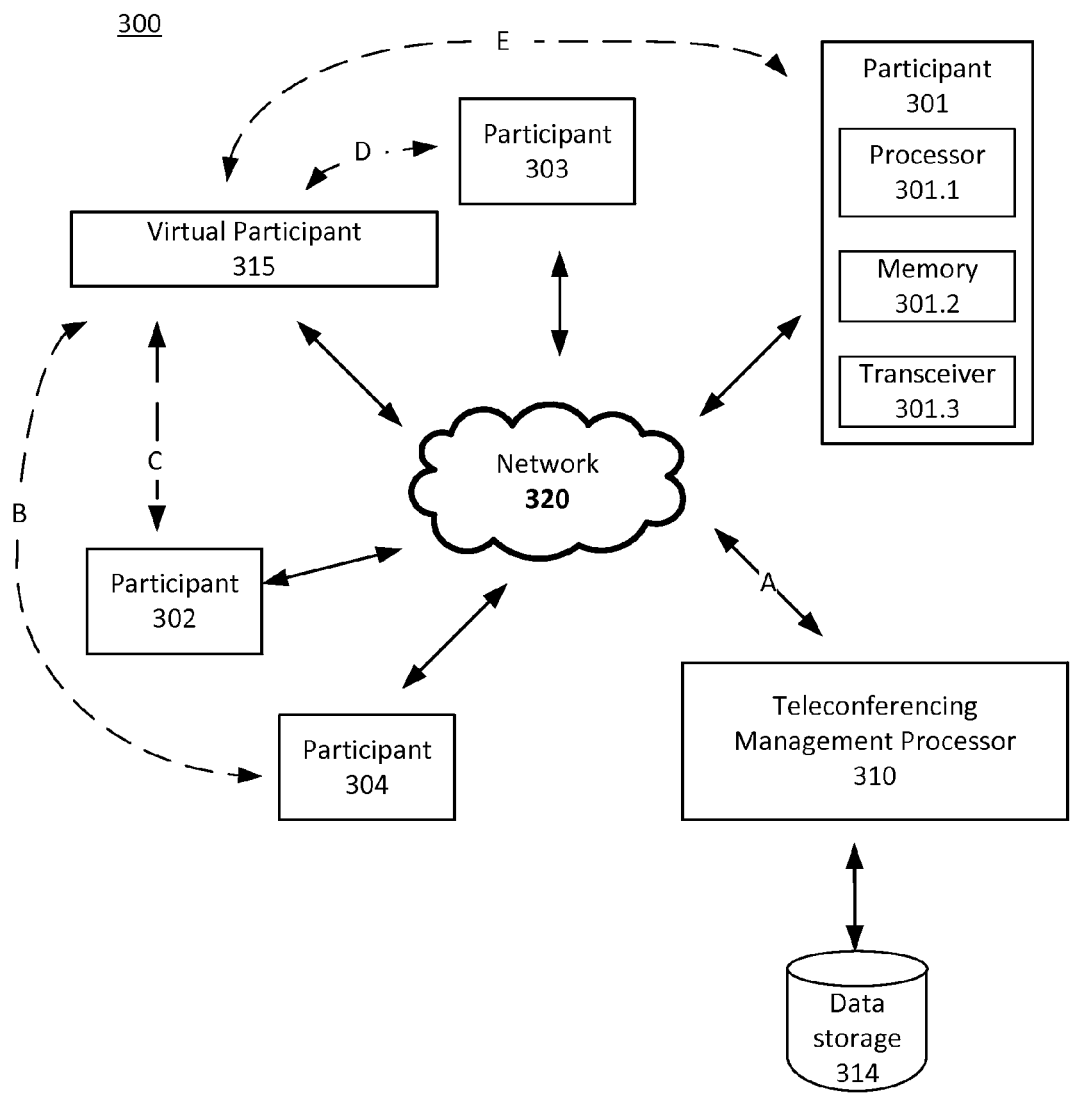
FIG. 3 shows a system configuration according to an embodiment of the disclosed subject matter.

FIG. 3 shows a system configuration according to an embodiment of the disclosed subject matter. The system 300 may include a teleconference management system 310, a plurality of participants 301-304, and a virtual participant 315. The teleconference management processor 310 may manage a teleconference session between a plurality of participants 301-304. The teleconference management processor 310 may be configured to execute computer program instructions for managing a plurality of teleconference sessions. The computer program instructions may be stored in data storage 314. The teleconference management processor 310 may communicate with participants 301-304 through the network 320 over a separate communication channel (channel A) for each teleconference session. The network 320 may be a cellular network, the Internet, a metropolitan area network, or the like.

The participants 301-304 may be any device capable of communicating over a cellular and/or a public network, such as the Internet. For example, the participants may be devices such as a smartphone, a cellular phone, a tablet computer, a netbook computer, a laptop computer and the like. The exemplary participant 301 may include at least one input device (not shown) for accepting speech, text data or user inputs a display device (not shown). The participant 301 may also include a processor 301.1, a memory 301.2, and a transceiver 301.3. The memory 301.2 may store data, such as language preference settings and other settings for each of the participants in a teleconference session, and computer program instructions, such as a computer application for communicating with the teleconference management processor 310. The transceiver 301.3 may facilitate communication between the participant 301 and other participants' 302-304 devices either through the network 320 or via a separate channel. The processor 301.1 may execute the computer program instructions in response the inputted speech, text and/or other user inputs. The display device may be a touchscreen display.

The participants 301-304 may be connected to the teleconference session using known communication protocols. For example, a telephone connected to a public switched network via a twisted pair using analog signals, while computerized participants may connect via the transport layer of the IP protocol suite to the teleconference management processor 310. For example, a participant 301 may contact a teleconference management processor 310 through a network address, a telephone number, or some other connection method via a network 320. In a scenario in which the virtual participant 315 provides translations specifically for an individual participant, a separate communication channel (channel B, C, D or E) may be established between the virtual participant 315 and participants 301-304. This scenario will be discussed in more detail with reference to FIG. 4. Although four participants are shown, more or fewer participants may be connected to the teleconferencing management processor 310 in a teleconference session.

The type of data sent from a participant 301-304 may include, for example, a participant identifier, which may be an account number, a network address, a participant telephone number or some other identifying data, language preference settings, and other participant specific data. Alternatively, the participants 301-304 may provide no information. The participants 301-304 may invite other participants to join the teleconference session. The invitation to join may include an identifier of the teleconference session and a location identifier, such as a telephone number or network address of the teleconference management processor 310. In which case, either the conference management processor 310 or the virtual participant 315 may provide identifying data, such as connection port identification of the respective participants, a time stamp indicating receipt time of the encoded audio data from the respective participants, speaker identification and the like. In another alternative, when a participant (e.g., 301) does not provide identifying data, the virtual participant 315 may receive the encoded audio data, perform language recognition, and identify the participant based on the recognized language. If more than one participant speaks the recognized language, the encoded audio data may be further analyzed by the virtual participant 315 for indications related to the specific participant using, for example, pattern recognition algorithms or some other known method of differentiating speakers of the same language. The results of the speaker recognition may indicate from which one of the plurality of participants the encoded audio data relates to participants 301-304, and assign an identifier to the respective participant. Any of the participants 301-304 may call the virtual participant by accepting an input into an input device, such as a microphone, keypad, or a touchscreen, requesting via a teleconference user interface that is presented through or on each of the participant's devices.

The teleconference management processor 310 may be a server configured to receive a request from at least one of the participants in a teleconference session for translation services provided by a virtual participant processor 315 to the teleconference session. In response to the request, a virtual participant processor 315 may be invited to join the teleconference session by the teleconference management processor 310. The invitation provided by the teleconference management processor may include a teleconference session identifier. Similar to participants 301-304, the virtual participant processor 315 may connect the teleconference management processor 310. The translated data received from the virtual participant processor 315 may be delivered to the respective teleconference participant 301-304 that requested the virtual participant processor 315.

The virtual participant processor 315 may be configured to intercept speech data from each of the teleconference participants 301-304 during a teleconference session. The virtual participant processor 315 may recognize the language of the speech input to each of the teleconference participants 301-304. Alternatively, the participants 301-304 may provide their language preference settings to the teleconference management system 310 or to the virtual participant processor 315. Using the language recognition result or the language preference setting, the virtual participant processor 315 may translate the intercepted speech data from the recognized speech language of each of the teleconference participants into the recognized speech language of the requesting participant (e.g., participant 301) and the remaining participants 302-304. The translated speech data may be provided by the virtual participant processor 315 to the teleconference management processor 310.

The virtual participant 315 may translate the intercepted encoded audio data by converting the encoded audio data into text data. The text data may be translated into translated text data of each of the different languages of the participants 301-304 in the teleconference session. The translated text data may be converted into speech data that is intended to be delivered to the respective participants. The virtual participant 315 may be communicatively coupled to a translation server (not shown), which may perform the translating in response to call from the virtual participant 315. The translation server may be responsive to control signals and data received from the virtual participant processor. The translation server may perform the translation as discussed above.

Figure 4:
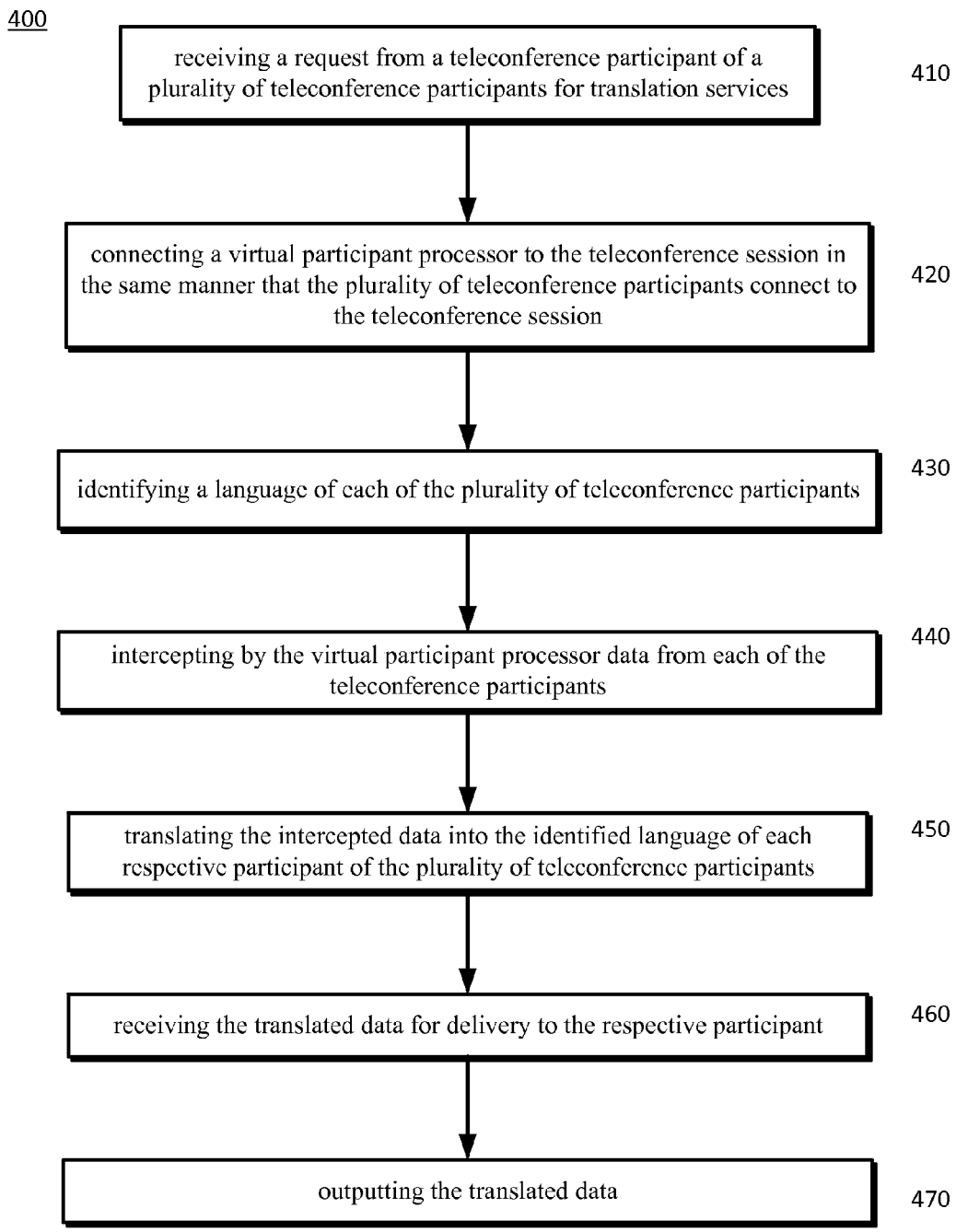
FIG. 4 shows a flowchart according to an embodiment of the disclosed subject matter.

FIG. 4 illustrates a flowchart of an exemplary process according to an embodiment of the presently disclosed subject matter. The process 400 may be executed by a server, such as server 23 of FIG. 2, which is configured to perform the teleconferencing functions. At step 410, a request from a teleconference participant of a plurality of teleconference participants may be received at the teleconference management processor that requests translation services for the teleconference. In response to the request from one of the teleconference session participants, a virtual participant processor may be connected to the teleconference session by the teleconference management processor (step 420). The language of the output speech that is to be delivered to each of the plurality of participants may be identified at step 430. The identification of the language may be done by receiving the language preference settings of the respective participants or by a speech recognition algorithm executing on a participant, or by the virtual participant processor. The virtual participant processor, at step 440, may begin intercepting encoded audio data intended to be exchanged between all participants in the teleconference session. In an embodiment, the virtual participant may intercept data specifically sent by and intended for the requesting participant. In this embodiment, the virtual participant and the requesting participant may communicate over a separate communication channel, such as shown in FIG. 3, for example. The interception of the encoded audio data prevents the encoded audio data from being delivered to the recipient participant directly from the sending participant. The virtual participant processor may translate intercepted encoded audio data and deliver the translated data to the recipient participant. The intercepted data may be translated into audio data in a language identified for each of the participants in the teleconference session (step 450). The translated audio data may be provided to the teleconference management processor for delivery to the participant (step 460). The translated data may be delivered to the respective participants in the identified language corresponding to the respective participants (step 470).

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer processor, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description and following appendices, for purpose of explanation, have been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method for providing translation services during a teleconference, comprising:
   receiving a request from one of the participants in the teleconference for the addition of a virtual participant processor to the teleconference, wherein the request includes a location identifier of a teleconference management processor and an identifier of the teleconference session;
   determining the language preferences of each of the teleconference participants;
   in response to a participant request for a virtual participant processor received by a teleconference management system, sending a request to the virtual participant processor to join the established teleconference;
   in response to the request by the teleconference management system, connecting a virtual participant processor to the teleconference session;
   intercepting speech data from each of the teleconference participants;
   recognizing a speech language of each of the teleconference participants;
   translating the intercepted speech data from the recognized speech language of each of the teleconference participants into the recognized speech language of each of the plurality of teleconference participant;
   providing translated speech data to the teleconference management processor; and
   outputting translated data received from the virtual participant processor for delivery to the respective teleconference participants.

2. A method for providing translation services during a teleconference, comprising:
   receiving a request from a first teleconference participant of a plurality of teleconference participants for translation services;
   in response to the request, connecting a virtual participant processor to the teleconference session, wherein the virtual participant processor provides language translation services for the teleconference participants;
   identifying a language of each of the plurality of teleconference participants;
   intercepting by the virtual participant processor data from each of the teleconference participants;
   translating the intercepted data into the identified language of each respective participant of the plurality of teleconference participants;
   receiving the translated data for delivery to the respective participant; and
   outputting the translated data.

3. The method of claim 2, wherein identifying a language of each of the plurality of teleconference participants comprises:
   recognizing a speech language of the data intercepted from the second teleconference participant.

4. The method of claim 2, wherein identifying a language of each of the plurality of teleconference participants comprises:
   determining a language preference setting of each of the plurality of teleconference participants after each teleconference participant connects to the teleconference session.

5. The method of claim 2, further comprising:
   calling, by the virtual participant, a translation server that is configured to translate the intercepted data based on the identified language of the teleconference participants.

6. The method of claim 2, wherein the request from the first teleconference participant includes a location identifier of a teleconference management processor and an identifier of the teleconference session.

7. The method of claim 2, further comprising:
   connecting, by the virtual processor, to the teleconference session by using a location identifier of a teleconference management processor and an identifier of the teleconference session.

8. A teleconferencing system, comprising:
   a teleconference management processor for managing a teleconference between a plurality of participant, the teleconference management processor configured to:

receive a request from one of the participants in the teleconference for the addition of a virtual participant processor to the teleconference;

responsive to the request, connect a virtual participant processor to the teleconference session; and deliver translated data received from the virtual participant processor to the respective teleconference participants; and the virtual participant processor for providing translation services to the teleconference management processor, the virtual participant processor configured to:

intercept speech data from each of the teleconference participants;

recognize a speech language of each of the teleconference participants;

translate the intercepted speech data from the recognized speech language of each of the teleconference participants into the recognized speech language of each of the plurality of teleconference participant; and provide the translated speech data to the teleconference management processor.

9. The teleconferencing system of claim 8, wherein the teleconference management processor is further configured to determine the language preferences of each of the teleconference participants.

10. The teleconferencing system of claim 8, wherein the teleconference management processor is further configured to:

respond to a participant request for a virtual participant processor by sending a request to the virtual participant processor to join the established teleconference; and provide the language preferences of each of the teleconference participants.

11. The teleconferencing system of claim 8, wherein the teleconference management processor is further configured to:

respond to a participant request for a virtual participant processor by sending a request to the virtual participant processor to join the established teleconference.

12. The teleconferencing system of claim 8, wherein the virtual participant processor is further configured to:

respond to the request from the conference management processor to join the established teleconference by connecting to the teleconference session; and translate speech or text data of other participants participating in the teleconference into the language indicated by the language preferences of the requesting participant, wherein the translation functions are performed only for the requesting participant.

13. The teleconferencing system of claim 8, wherein the virtual participant processor is further configured to:

generate a call to a translation engine to translate the intercepted speech data from the recognized speech language of each of the teleconference participants.

14. The teleconferencing system of claim 8, further comprising:

a translation server responsive to control signals and data received from the virtual participant processor, wherein the translation server translates the data received from the virtual participant processor into a language different than the language of the received data.

15. The teleconferencing system of claim 8, wherein the virtual processor is further configured to:

obtain language preferences from the data received from each of the participants connected in the teleconference session.

16. The teleconferencing system of claim 8, wherein the virtual processor is further configured to:

call a language recognition engine to process the intercepted speech from each of the participants connected in the teleconference session; and produce a recognition result identifying the language of each of the participants connected in the teleconference session.

17. The teleconference system of claim 8, wherein the virtual processor is connected to the teleconference session by using a location identifier of the teleconference management processor and an identifier of the teleconference session.

18. The teleconference system of claim 17, wherein the virtual processor is connected to the teleconference session by using a location identifier of the teleconference management processor and an identifier of the teleconference session.

* * * * *